(12) United States Patent
Kim

(10) Patent No.: US 11,357,299 B1
(45) Date of Patent: Jun. 14, 2022

(54) CARRIER WITH RETRACTABLE WHEELS

(71) Applicant: Minjae Kim, Incheon (KR)

(72) Inventor: Minjae Kim, Incheon (KR)

(*) Notice: Subject to any disclaimer, the term of this patent is extended or adjusted under 35 U.S.C. 154(b) by 0 days.

(21) Appl. No.: 17/588,319

(22) Filed: Jan. 30, 2022

(30) Foreign Application Priority Data

Mar. 11, 2021 (KR) .................. 10-2021-0031855

(51) Int. Cl.
*A45C 5/14* (2006.01)
*B60S 1/68* (2006.01)

(52) U.S. Cl.
CPC ................ *A45C 5/146* (2013.01); *B60S 1/68* (2013.01); *A45C 2005/148* (2013.01)

(58) Field of Classification Search
CPC ..................................................... A45C 5/146
See application file for complete search history.

(56) References Cited

FOREIGN PATENT DOCUMENTS

| CN | 204561205 U | 8/2015 |
|---|---|---|
| CN | 207383757 U | 5/2018 |
| KR | 10-1670603 | 10/2016 |
| KR | 10-2018-0137453 | 12/2018 |
| KR | 20190002055 U | 8/2019 |
| KR | 10-2096021 | 4/2020 |

OTHER PUBLICATIONS

English Specification of CN204561205U.
English Specification of CN207383757U.
English Specification of 10-2096021
English Specification of 10-2018-0137453.
English Specification of KR20190002055U.
English Specification of 10-1670603.

*Primary Examiner* — John K Fristoe, Jr.
*Assistant Examiner* — Justin Caudill
(74) *Attorney, Agent, or Firm* — Antonio Ha & U.S. Patent LLC

(57) ABSTRACT

According to an embodiment, a carrier with retractable wheels comprises a main body including a storage space and an inlet hole formed in a bottom to be open or closed by a sliding plate and a moving unit having a body pivotably provided in the inlet hole and a wheel attached to an end of the body. When the inlet hole is closed by the sliding plate, the moving unit is pivoted up, the wheel is supported by the sliding plate to be positioned inside the inlet hole and, when the inlet hole is open, the moving unit is pivoted down to stick out of the inlet hole.

1 Claim, 6 Drawing Sheets

CARRIER WITH RETRACTABLE WHEELS

CROSS-REFERENCE TO RELATED APPLICATION(S)

This application claims priority under 35 U.S.C. 119 to Korean Patent Application No. 10-2021-0031855, filed on Mar. 11, 2021, in the Korean Intellectual Property Office, the disclosure of which is herein incorporated by reference in its entirety.

TECHNICAL FIELD

The present invention relates to a carrier with retractable wheels, and more particularly, to a carrier with retractable wheels formed to be able to move and store items or articles therein during travel.

DESCRIPTION OF RELATED ART

Luggage or baggage typically has wheels or casters attached to the bottom to facilitate carrying.

According to the policy of the airline the passenger uses, some luggage bags smaller than a predetermined size are allowed to be brought on board while others in excess of the size need to be checked in. Luggage bags have been developed to load and carry as many items as possible within the limited size range.

In conventional wheeled luggage, the wheels may stick out from the bottom, causing an increase in the overall size of the luggage and hassles in treating. Further, if the luggage is improperly or carelessly treated, the wheels may easily be damaged or broken. Therefore, a need exists for addressing such issues.

SUMMARY

According to an embodiment, a carrier with retractable wheels comprises a main body including a storage space and an inlet hole formed in a bottom to be open or closed by a sliding plate and a moving unit having a body pivotably provided in the inlet hole and a wheel attached to an end of the body. When the inlet hole is closed by the sliding plate, the moving unit is pivoted up, the wheel is supported by the sliding plate to be positioned inside the inlet hole and, when the inlet hole is open, the moving unit is pivoted down to stick out of the inlet hole.

The carrier may further comprise a fastening member pivotably provided in the inlet hole in a position eccentric from the body. The fastening member, together with the body, is pivoted down to come in tight contact with the body to support the body.

The body may include a first fixing hole formed in a first side thereof, and the fastening member may include a first fixing protrusion at an end thereof. In a position where the body and the fastening member together are pivoted down and contact each other, the first fixing protrusion may be fitted into the first fixing hole.

The body may further include a second fixing hole formed in a second side thereof, and the sliding plate may include a second fixing protrusion fitted into the second fixing hole to fasten the body pivoted down when the sliding plate opens the inlet hole.

The carrier may further comprise a fastening member pivotably provided in the inlet hole in a position eccentric from the body. The fastening member, together with the body, may be pivoted down to come in tight contact with the body to support the body. The carrier may further comprise a brush attached to a lower end of the fastening member and positioned to contact the wheel when the fastening member and the body are in contact with each other. The body may include a first fixing hole formed in a first side thereof, and the fastening member may include a first fixing protrusion at an end thereof. In a position where the body and the fastening member together are pivoted down and contact each other, the first fixing protrusion may be fitted into the first fixing hole. The body may further include a second fixing hole formed in a second side thereof, and the sliding plate may include a second fixing protrusion fitted into the second fixing hole to fasten the body pivoted down when the sliding plate opens the inlet hole.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
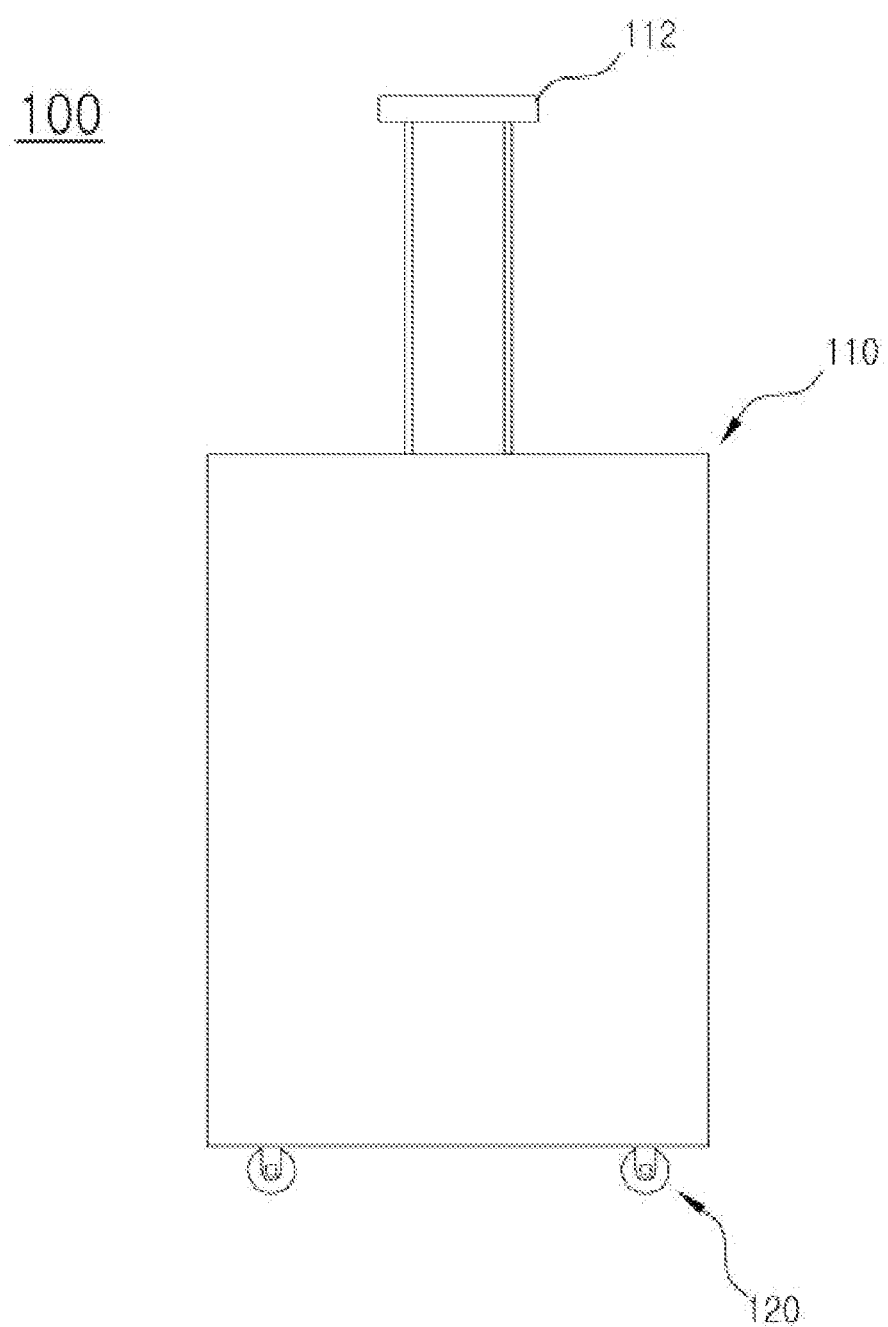
FIG. 1 is a view illustrating a carrier with retractable wheels according to an embodiment.

Advantages and features of the present invention, and methods for achieving the same may be apparent from the embodiments described below with reference to the accompanying drawings.

However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

As used herein, the singular forms "a," "an," and "the" are intended to include the plural forms as well, unless the context clearly indicates otherwise. Hereinafter, various embodiments of a carrier with retractable wheels are described below with reference to the accompanying drawings.

Figure 2:
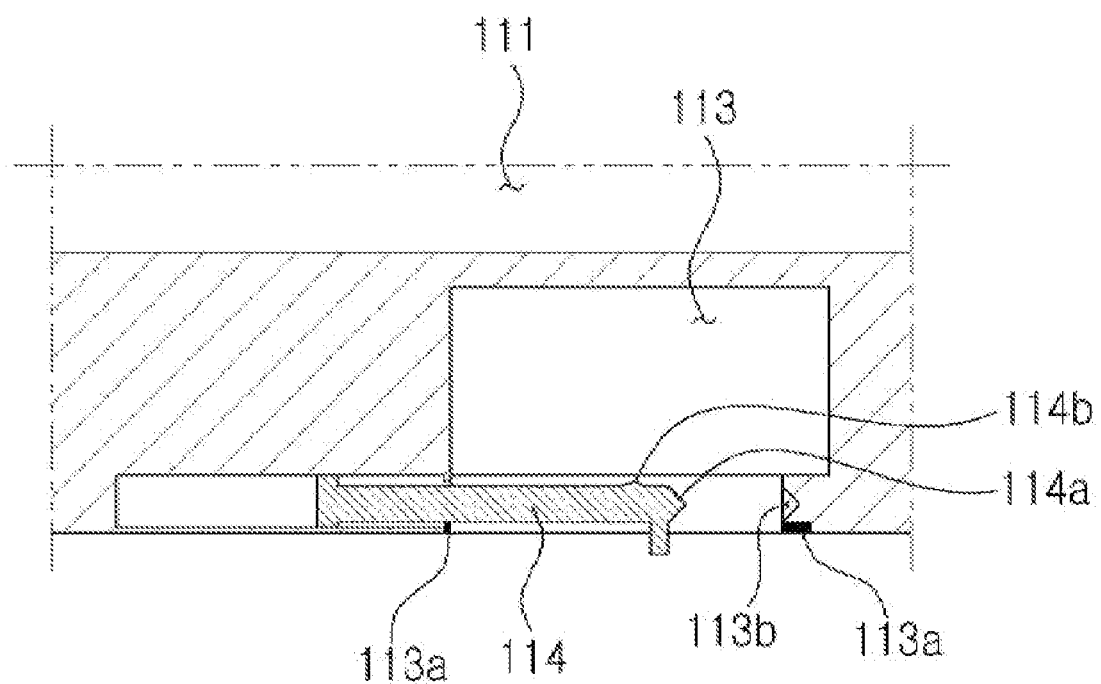
FIG. 2 is a cross-sectional view illustrating a main body of a carrier with retractable wheels according to an embodiment.
Figure 3:
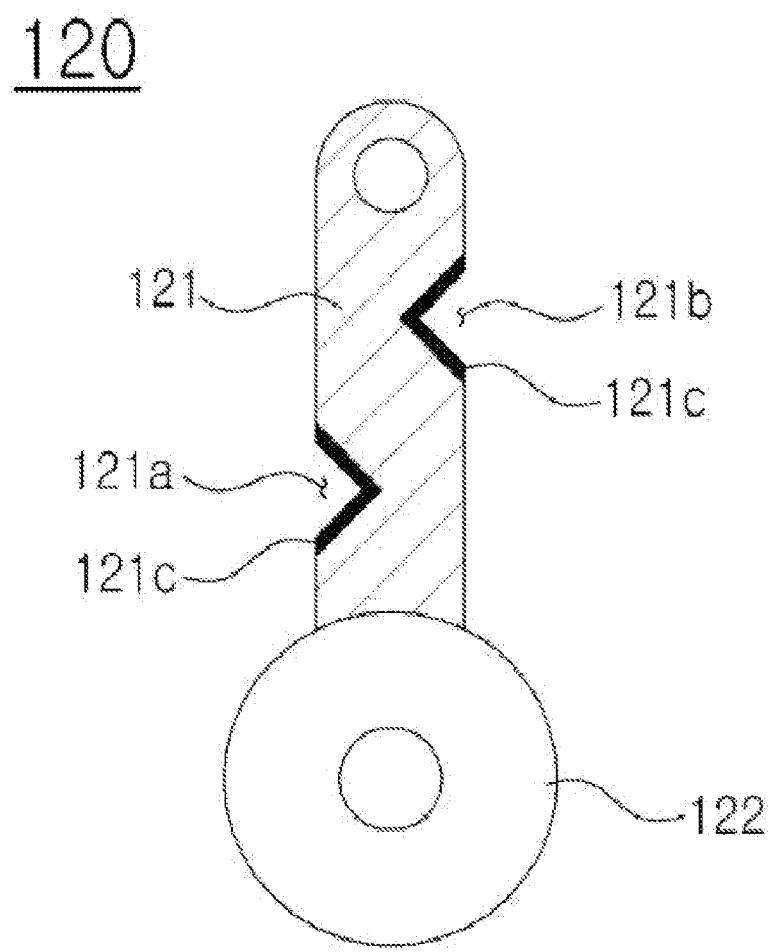
FIG. 3 is a cross-sectional view illustrating a moving unit of a carrier with retractable wheels according to an embodiment.
Figure 4:
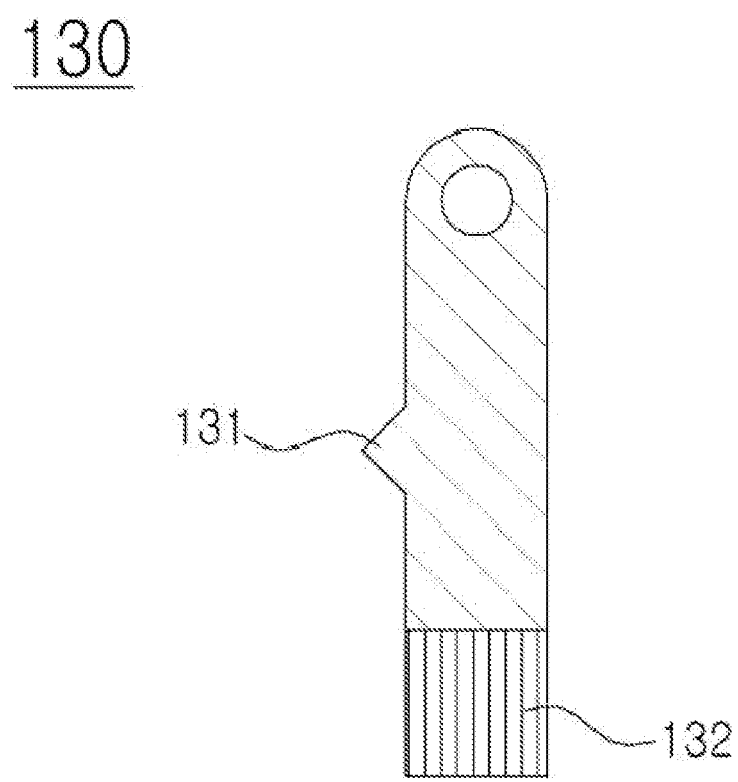
FIG. 4 is a cross-sectional view illustrating a fastening member of a carrier with retractable wheels according to an embodiment.
Figure 5:
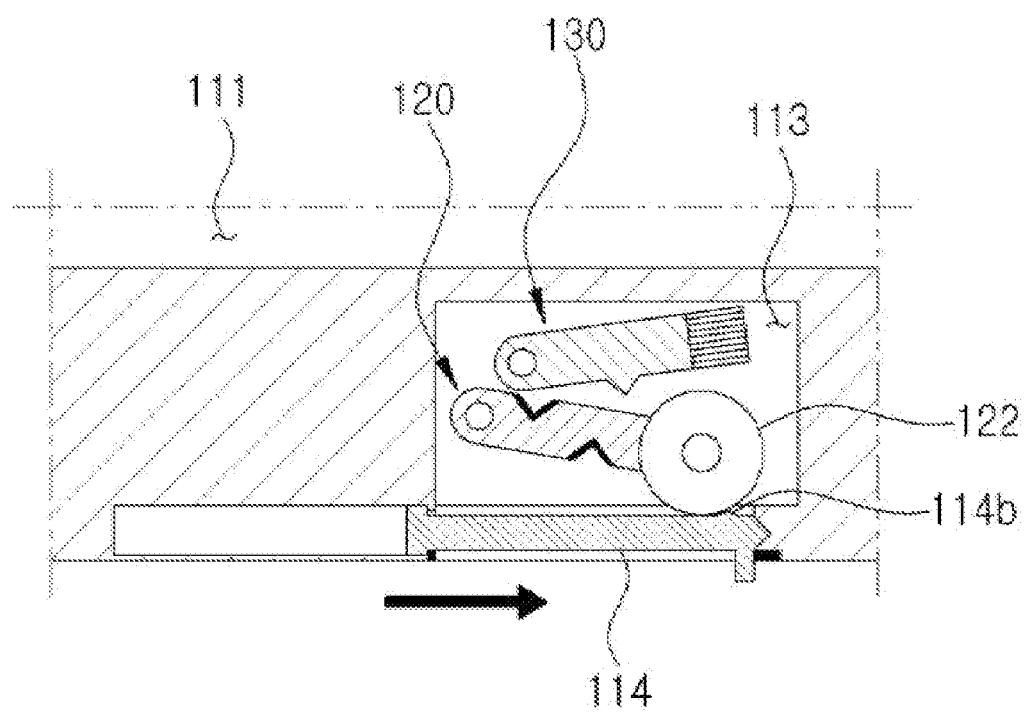
FIGS. 5 and 6 are views illustrating an example in which a moving unit of a carrier with retractable wheels is operated according to an embodiment.
Figure 6:
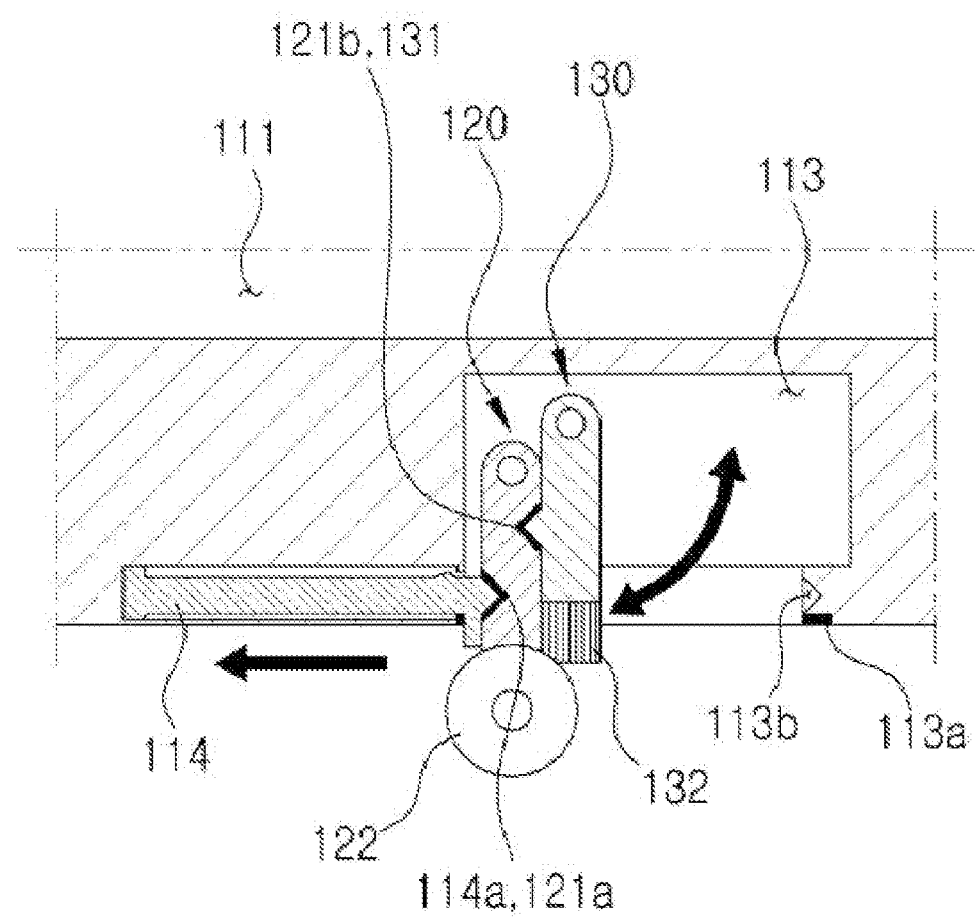

FIG. 1 is a view illustrating a carrier with retractable wheels according to an embodiment. FIG. 2 is a cross-sectional view illustrating a main body of a carrier with retractable wheels according to an embodiment. FIG. 3 is a cross-sectional view illustrating a moving unit of a carrier with retractable wheels according to an embodiment. FIG. 4 is a cross-sectional view illustrating a fastening member of a carrier with retractable wheels according to an embodiment. FIGS. 5 and 6 are views illustrating an example in which a moving unit of a carrier with retractable wheels is operated according to an embodiment.

As used herein, carrier may come in various types, such as a piece of luggage or baggage, a suitcase, a carry-on bag, or any other types of containers or bags for containing and carrying items or articles.

Referring to FIGS. 1 to 6, the carrier with retractable wheels is provided with wheels that may be drawn in or out to be prevented from external impact or shocks.

According to an embodiment, the carrier 100 with retractable wheels includes a main body 110, a moving unit 120, and a fastening member 130.

The main body 110 includes a storage space 111 to be open or closed. A handle 112 is coupled to the top of the main body 110, and an inlet hole 113 is formed in the bottom of the main body 110.

The inlet hole 113 is opened and closed by a sliding plate 114.

The inlet hole 113 may be opened when the sliding plate 114 moves in one direction, and the inlet hole 113 is closed when the sliding plate 114 moves in the opposite direction.

The sliding plate 114 may be magnetically fixed when the inlet hole 113 is opened and closed.

For example, first magnetic bodies 113a are formed at a first side and a second side, respectively, of the inlet hole 113.

The sliding plate 114 is formed of a metal to be magnetically attached to the first magnetic bodies 113a.

A first fixing protrusion 114a is formed at an end of the sliding plate 114.

The first fixing protrusion 114a has a triangular shape in cross-sectional view.

A recess 113b is formed in the second side of the inlet hole 113 so that the first fixing protrusion 114a is inserted thereto.

A stopping jaw 114b is formed on the top surface of the sliding plate 114.

The moving unit 120 is pivotably coupled in the inlet hole 113. The moving unit 120 is pivoted to be drawn in or out of the inlet hole 113. For example, a shaft (not shown) may be provided in the inlet hole 113 to pass through an end of the moving unit 120, and the moving unit 120 may be pivoted about the shaft (not shown).

For example, the moving unit 120 includes a body 121 that has a first end pivotably coupled in the inlet hole 113 and a second end coupled with a wheel 122.

When drawn in the inlet hole 113, the moving unit 120 is supported by the sliding plate 114 closing the inlet hole 113 and, when the sliding plate 114 is open, the moving unit 120 is pivoted downward to come out of the inlet hole 113.

When the body 121 is pivoted down to come out of the inlet hole 113, a first side surface of the body 121 comes in tight contact with the sliding plate 114.

In this case, the body 121 and the sliding plate 114 come in tight contact with other while positioned perpendicular to each other.

A triangular first fixing hole 121a is formed in the first side surface of the body 121 to allow the first fixing protrusion 114a to be fitted thereto.

A second fixing hole 121b is formed in a second side surface, opposite to the first side surface, of the body 121.

The second fixing hole 121b has a triangular shape in cross section.

With the moving unit 120 positioned inside the inlet hole 113, the moving unit 120 is supported by the sliding plate 114, and the wheel 122 is stuck to the stopping jaw 114b to thus hold the sliding plate 114 in the position.

The sliding plate 114 remains in the position by the load of the moving unit 120 and being stuck at the stopping jaw 114b by the wheel 122. The sliding plate 114 may be open by laying the main body 110 to release the load of the moving unit 120.

The fastening member 130 is pivotably coupled in a position eccentric from the body 121 inside the inlet hole 113. For example, a shaft (not shown) may be provided in the inlet hole 113 to pass through an end of the fastening member 130, and the fastening member 130 may be pivoted about the shaft (not shown).

The fastening member 130, together with the body 121, is positioned inside the inlet hole 113. The fastening member 130 is pivoted down by its weight.

When positioned inside the inlet hole 113, the fastening member 130 is supported by the body 121.

When pivoted down, the fastening member 130 comes in tight contact with the body 121 in parallel with the body 121.

The pivoted portion of the fastening member 130 is positioned preferably higher than the pivoted portion of the body 121.

This is to allow the fastening member 130 to be pivoted up together with the body 121 or to be pivoted down by its weight to come in tight contact with the body 121.

A second fixing protrusion 131 is formed at a lower end of the fastening member 130 to face the body 121.

When the fastening member 130 and the body 121 are in tight contact with each other, the second fixing protrusion 131 is fitted into the second fixing hole 121b.

The second fixing protrusion 131 has a triangular shape to correspond to the second fixing hole 121b.

A brush 132 is attached to the bottom of the fastening member 130 to contact the wheel 122 when the fastening member 130 and the body 121 are in tight contact with each other.

The brush 132 may remove foreign substances from the surface of the wheel 122.

The body 121 may be magnetically fixed to the sliding plate 114 and the fastening member 130.

For example, the first fixing protrusion 114a and the second fixing protrusion 131 are formed of metal, and second magnetic bodies 121c are formed in the first fixing hole 121a and the second fixing hole 121b, respectively.

When the body 121 and the fastening member 130 are in tight contact with each other, the first fixing protrusion 114a is magnetically coupled into the first fixing hole 121a, and the second fixing protrusion 131 is magnetically coupled into the second fixing hole 121b.

Thus, the body 121 may be securely fastened on two opposite sides thereof by the first fixing protrusion 114a and the second fixing protrusion 131.

According to the embodiments of the disclosure, as described above, in the carrier with retractable wheels, the wheel may be drawn in or out of the inlet hole in the main body as necessary. For example, the wheel may be drawn out to make moving the carrier easier. Further, the wheel may be drawn in the inlet hole to minimize the overall size and prevent damage by external impact.

It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting. It should be noted that the scope of the present invention is defined by the appended claims rather than the described description of the embodiments and include all modifications or changes made to the claims or equivalents of the claims.

What is claimed is:

1. A carrier with retractable wheels, comprising:
a main body including a storage space and an inlet hole formed in a bottom to be open or closed by a sliding plate;
a moving unit having a body pivotably provided in the inlet hole and a wheel attached to an end of the body, wherein when the inlet hole is closed by the sliding plate, the moving unit is pivoted up, the wheel is supported by the sliding plate to be positioned inside the inlet hole and, when the inlet hole is open, the moving unit is pivoted down to stick out of the inlet hole;
a fastening member pivotably provided in the inlet hole in a position eccentric from the body, wherein the fastening member, together with the body, is pivoted down to come in tight contact with the body in parallel with the body to support the body; and
a brush attached to a lower end of the fastening member and positioned to contact the wheel when the fastening member and the body are in contact with each other, wherein the body includes a first fixing hole formed in a first side thereof, and the fastening member includes a first fixing protrusion at an end thereof, wherein in a position where the body and the fastening member together are pivoted down and contact each other, the first fixing protrusion is fitted into the first fixing hole, and wherein the body further includes a second fixing hole formed in a second side thereof, and the sliding plate includes a second fixing protrusion fitted into the second fixing hole to fasten the body pivoted down when the sliding plate opens the inlet hole.

* * * * *